United States Patent [19]

Swindle

[11] Patent Number: 4,914,853
[45] Date of Patent: Apr. 10, 1990

[54] FISH DEHOOKING DEVICE

[75] Inventor: Raymond L. Swindle, Palm Coast, Fla.

[73] Assignee: DeHooker, Inc., South Daytona, Fla.

[21] Appl. No.: 267,827

[22] Filed: Nov. 7, 1988

[51] Int. Cl.⁴ .............................................. A01K 97/00
[52] U.S. Cl. ....................................................... 43/53.5
[58] Field of Search ............................................ 43/53.5

[56] References Cited

U.S. PATENT DOCUMENTS

| | | | |
|---|---|---|---|
| 2,441,458 | 5/1948 | Underwood | 43/53.5 |
| 2,519,098 | 8/1950 | Aye | 43/53.5 |
| 2,662,331 | 12/1953 | Borup | 43/53.5 |
| 2,781,599 | 2/1957 | Steiner | 43/53,5 |
| 3,099,100 | 7/1963 | Wiseman | 43/53.5 |
| 3,603,021 | 9/1971 | Nunley | 43/53.5 |
| 3,680,248 | 8/1972 | Wilkinson | 43/53.5 |
| 3,888,038 | 6/1975 | Howell | 43/53.5 |
| 4,127,957 | 12/1978 | Bourquin | 43/53.5 |

Primary Examiner—M. Jordan
Attorney, Agent, or Firm—Edward M. Livingston, Esq.

[57] ABSTRACT

A fish dehooking device is provided with a rigidly holdable T-shaped handle and a long rod with a smoothly-bent angled section at the opposite end for removing fishhooks from any depth within a fish. An optional enlarged spreader section of the rod is provided as a wedged base for removing the fishhooks and for preventing dislodged fishhooks being removed from puncturing intestinal sections or air bags that would lower the quality of the meat of the fish. The enlarged spreader section also allows fishhooks to be removed from the mouths of larger fish that have strong jaws and dangerous teeth. A method of using this device allows the holding and placing of hooked fish without contacting the fish or sharp projections on some types of fish.

4 Claims, 2 Drawing Sheets

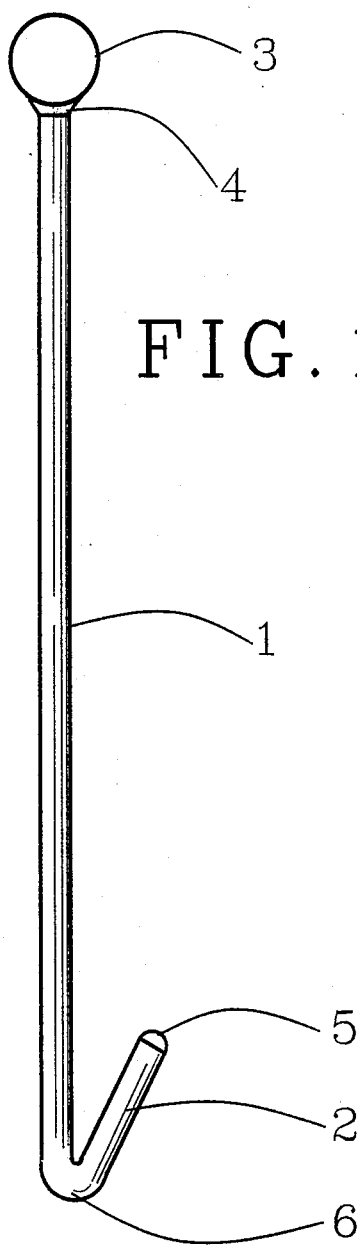
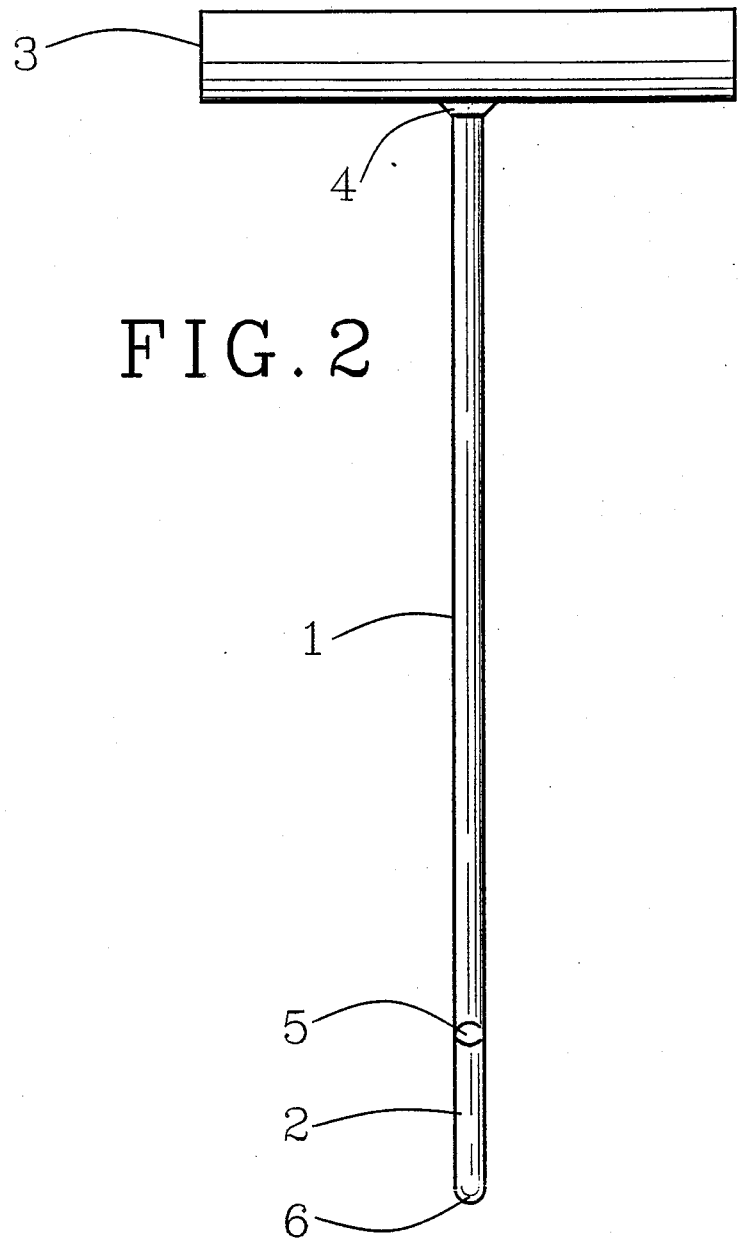
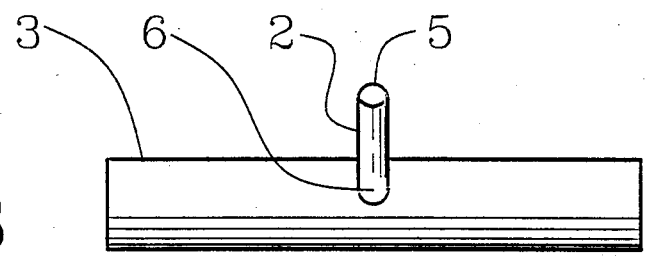
FIG. 1
FIG. 2
FIG. 3

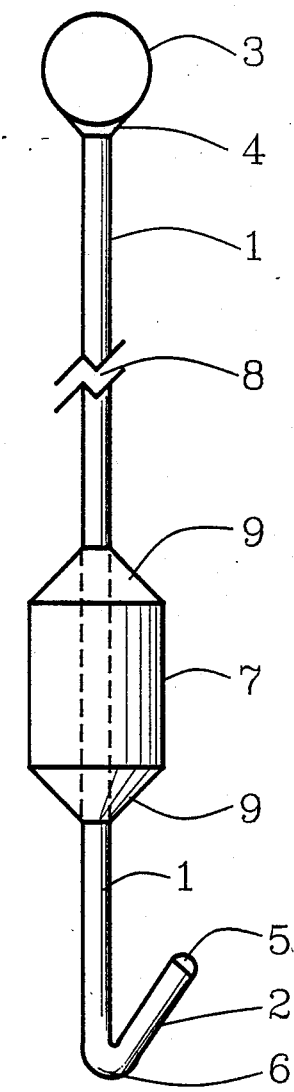
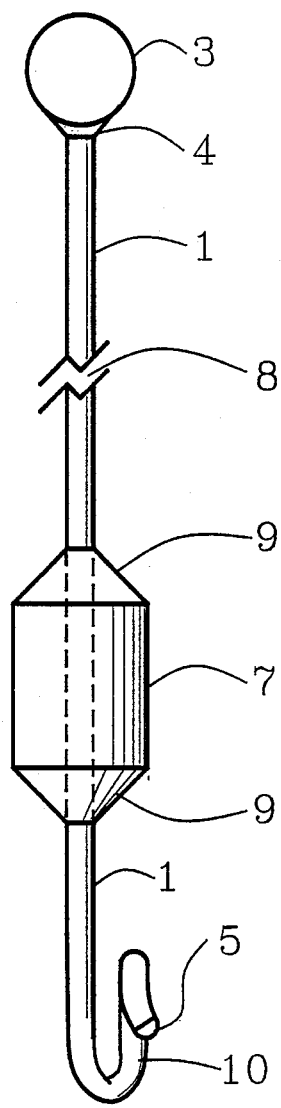
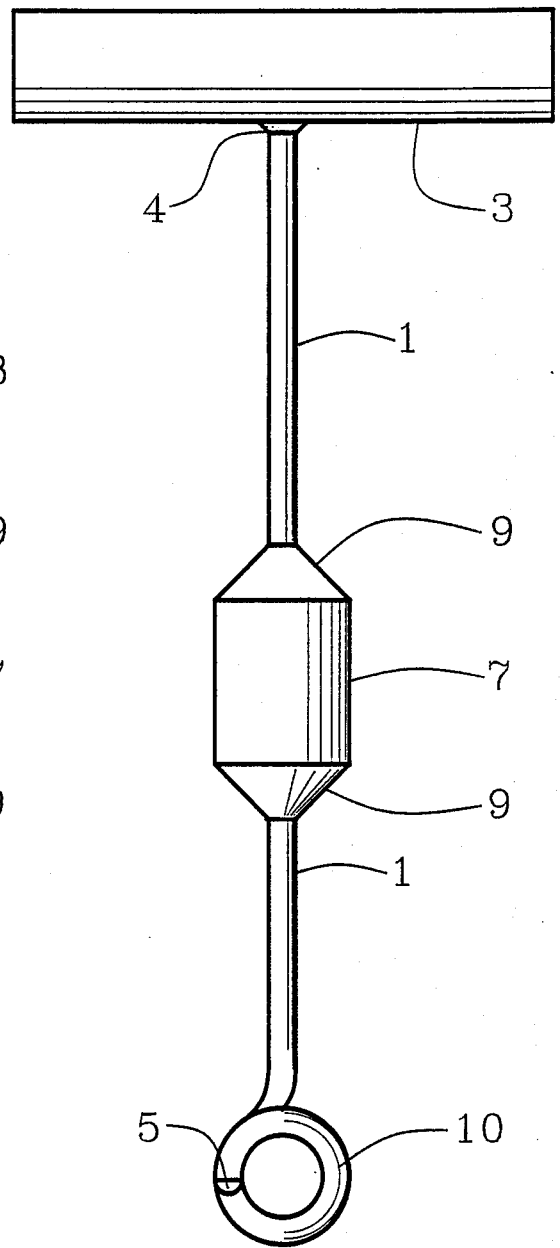
FIG. 4    FIG. 5    FIG. 6
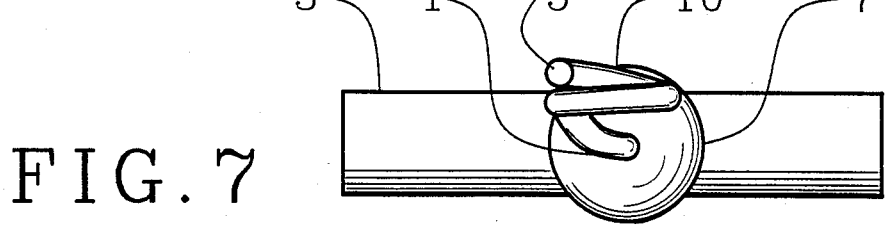
FIG. 7

FISH DEHOOKING DEVICE

BACKGROUND OF THE INVENTION

This invention relates to devices for removing fishhooks from the mouths of fish. In particular, it relates to a rod with a T-shaped handle at one end and a fishhook, dislodging angled portion at the opposite end. Spreaders for holding open the throat and mouth of a large fish and devices for engaging the fishhook also are included.

Included in the prior art are U.S. Pat. No. 3,388,038 which describes a device with a rounded bend at the end and a round handle to turn a shaft to which the rounded end is connected for inserting it into the fish's mouth. This was advantageous in allowing a user to avoid handling the fish and taking the chance of being cut by sharp projections of various forms from different types of fish. But the rounded bend did not engage the hook as well as the angled member in this invention. Highly important, it did not provide the rigidity for handling the fishhook remover that is provided by the handle utilized for this invention. U.S. Pat. No. 3,099,100 provided some of the same advantages as U.S. Pat. No. 3,388,038 but with a different set of conveniences not associated with the improvements that have been devised by the applicants in the instant invention to position the dehooker for removing the hooks. U.S. Pat. No. 2,887,817 described an effective device for removing a hook from a fish's jaws when it protruded through the fish's jaw and the fish could be hand-held while the hook was being removed. But, it did not teach nor describe a device for removing hooks deeply within a fish without tearing open the insides of the fish. U.S. Pat. No. 2,781,599 taught a device for removing fishhooks more deeply in a fish but did not prevent a hook from puncturing intestines or air bags and contaminating or degrading the meat. A major improvement was made by U.S. Pat. No. 2,749,653. It recognized the need for bracing against the body of a fish for pulling a hook out and described a device for pulling the hook out linearly to the point of the hook. U.S. Pat. No. 2,441,458 provided some of the same advantages but with a different device.

Critical problems involved in removing fishhooks include (a) avoiding puncturing inside intestinal or airbag walls with the hook that would degrade the meat, (b) providing a leverage or fulcrum base from which to pull out a fishhook, and (c) handling the fish safely. These and other problems are solved effectively and conveniently with this invention.

SUMMARY OF THE INVENTION

One of the objectives of this invention is to provide an effective, simple and convenient device for removing fishhooks for relatively small fish with one of its embodiments.

Another object of this invention is to provide increasingly firm and safe devices which are attachable to a basic device for removing fishhooks from increasingly big and dangerous fish to handle.

Another object of this invention is to prevent fishhooks from re-engaging the insides or air bags of fish when being withdrawn after the fishhooks have been dislodged initially.

Another object of this invention is to provide a device for removing fishhooks from deeply within the fish.

Another object of this invention is to provide a device for holding and placing hooked fish before removal of lodged fishhooks from them.

The instant invention accomplishes the above and other objects by providing a basic device that comprises a rod held by a T-shaped handle with a smooth angular bend at the end. The angular bend is optionally curved back against itself. An optional spreader sleeve is provided to spread and hold open a fish's throat to more easily remove the hook. The spreader also provides protection from re-entry of the fishhook into the fish's inner walls after it has been dislodged and is being removed from the fish.

Other objects, advantages and features of the invention will become readily apparent from the following detailed description of the specific embodiments thereof when read in conjunction with the accompanying drawings.

DESCRIPTION OF THE DRAWINGS

This invention is described in claims and in a description of preferred embodiments in relation to the following drawings wherein:

FIG. 1 is a side view of a basic embodiment comprising a rod, a handle and an angled portion of the rod;

FIG. 2 is a front view of the basic embodiment;

FIG. 3 is a bottom view of the basic embodiment;

FIG. 4 is a side view of the basic embodiment with an optional fixed spreader sleeve attached;

FIG. 5 is a side view of another embodiment with a circular member bent back at an angle toward the rod and an optional fixed spreader.

FIG. 6 is a front view of the embodiment of FIG. 5 with an angled member bent back parallel to the rod and spreader.

FIG. 7 is a bottom view of the embodiment of FIG. 6.

DESCRIPTION OF THE PREFERRED EMBODIMENT

Referring to FIGS. 1, 2, and 3, a rod 1 is provided with an angled portion 2 at one end and a T-shaped handle 3 at the other end. The handle 3 may be solidly attached as indicated by weld or solder bead 4. The angled portion 2 is provided with a rounded end 5 and a rounded bend 6 to avoid sharp sections. In FIG. 3, the angled portion 2 is shown from the bottom at the right angles to the handle 3.

Another embodiment of the device shown in FIG. 4 has an optional spreader 7 to spread a fish's mouth which is attached rigidly to the rod 1. The spreader 7 can be tapered at the hook end for ease of insertion into a fish's mouth. A broken section 8 illustrates additional rod length that can be provided to use this embodiment of the invention for removing hooks from relatively large fish. The embodiment of the invention illustrated in FIG. 4 is for taking hooks from bigger fish and from fish that are dangerous to handle because of sharp projections in their fins or because of predatory teeth. For this reason, the rod 1 is shown as being slightly larger in diameter than the FIG. 1 and 2 embodiments. The larger diameter allows it to be constructed longer with adequate rigidity. The spreader 7 has wedges 9 on the top and bottom to make it easier to insert and remove from the throat of a fish.

Another embodiment of the invention is shown in FIGS. 5 and 6. Referring to FIG. 5, a loop-angled circular portion 10 is provided optionally to the straight bend. It is shown in this embodiment of the invention with a fixed spreader 7. This embodiment of the invention is for removing hooks from relatively large fish.

Referring to FIG. 6, the circular portion 10 is shown in relationship to the spreader 7, the rod 1, and the handle 3.

Referring to FIG. 7, the circular portion 10 is shown from the bottom in relationship to the rod 1, the spreader 7 and the handle 3.

Material for construction of this invention is preferably to be stainless steel in order to preclude rusting and for its great tensile strength.

As described in detail above, it should be apparent that there has been provided a new, useful and non-obvious device for the removal of fishhooks from a variety of small and large fish in a safe and effective manner. Among the many advantages of this invention over prior fishhook removers is that a large diameter spreader is provided to keep the throat of fish open while removing hooks so that the inside of fish will not be torn causing damage to the fish.

A wide variety of modifications and adaptations of this invention are visualized by the inventor and are included within this invention as described by the following claims.

I claim:

1. A fish dehooking device comprising:
   a rod having a handle perpendicular to the rod and attachable to one end of the rod;
   an angled portion at the opposite end of the rod from the handle containing one sideways bend to form approximately a thirty-degree angle between the angled portion and the rod;
   a blunt, non-pointed end on the angled portion of the rod; and
   a fixed spreader sleeve positioned in the proximity of the angled portion of the rod at a distance from the angled portion that would engage the vicinity of teeth of fish from which hooks were being removed with the device.

2. A fish dehooking device comprising:
   a rod having a handle perpendicular to the rod and rigidly attachable to the end of the rod;
   an angled portion at the opposite end of the rod from the handle containing one loop angled back toward the rod and open at the end with a sufficient distance between the rod and the loop-angled section to allow entry of a fishhook between the rod and the loop-angled section of the rod; and
   a blunt, non-pointed end on the angled portion of the rod.

3. A fish dehooking device according to claim 2 wherein the angled portion of the rod is loop-angled back to a side of the rod with a sufficient distance between the rod and the loop-angled section to allow entry of a fishhook between the rod and the loop-angled section of the rod and further comprising:
   a fixed spreader sleeve positioned in the proximity of the angled portion of the rod at a distance from the angled portion that would engage the vicinity of teeth of fish from which hooks were being removed with this device.

4. A method for using a fish dehooking device consisting of a rod having a handle perpendicular to the rod and rigidly attachable to one end of the rod; an angled portion at the opposite end of the rod from the handle containing one loop angled back toward the rod and open at the end with a sufficient distance between the rod and the loop-angled section to alloy entry of a fishhook between the rod and the loop-angled section of the rod; and a spreader sleeve at the outside periphery of the rod positioned to engage teeth, throat and other portions of the body of a fish outwardly from a position at which a fishhook is lodged in a fish comprising:
   linearly threading into the loop of the loop-angled section a fishing line with a fishhook lodged in a fish;
   inserting the threaded fishing dehooker into a fish with the line passing through the loop to a position beside a lodged fishhook;
   pulling fishing line from the lodged fishhook tautly; and
   removing the fishhook and the device together from the fish with the fishhook remaining close to the end of the spreader such that the spreader holds the fishhook away from inside walls of the fish and prevents re-entry of the fishhook into the fish as it is being removed.

* * * * *